United States Patent [19]
Fournier et al.

[11] Patent Number: 5,930,991
[45] Date of Patent: Aug. 3, 1999

[54] DOUBLE DOOR THRUST REVERSER ASSEMBLY WITH STRUT-CARRIER DOOR PIVOT PINS

[75] Inventors: Alain M. Fournier, Le Plessis Robinson; Bernard Laboure, Vélizy-Villacoublay, both of France

[73] Assignee: Societe de Construcion des Avions Hurel-Dubois (societe anonyme, Meudon la Foret, France

[21] Appl. No.: 08/945,926

[22] PCT Filed: May 29, 1996

[86] PCT No.: PCT/FR96/00804

§ 371 Date: Nov. 21, 1997

§ 102(e) Date: Nov. 21, 1997

[87] PCT Pub. No.: WO96/38661

PCT Pub. Date: Dec. 12, 1996

[30] Foreign Application Priority Data

Jun. 2, 1995 [FR] France .................................. 95 06561

[51] Int. Cl.⁶ .................. F02K 1/70; F02K 1/60
[52] U.S. Cl. .................. 60/226.2; 60/230; 244/110 B; 239/265.19

[58] Field of Search .................. 60/226.2, 230, 60/271; 244/110 B; 239/265.19, 265.27, 265.29, 265.31

[56] References Cited

U.S. PATENT DOCUMENTS 3,050,937  8/1962  James et al. .
3,266,734  8/1966  Gahagan et al. .................. 60/230

FOREIGN PATENT DOCUMENTS

0 048 669  3/1982  European Pat. Off. .
0 574 730  12/1993  European Pat. Off. .
2 697 292  4/1994  France .

*Primary Examiner*—Ted Kim
*Attorney, Agent, or Firm*—Young & Thompson

[57] ABSTRACT

A pivoting door type thrust reverser assembly for a dual flow engine includes a fixed cowling construction with a front body portion (9) and a rear body portion (12) joined by longitudinal beams (10,11) and defining reversal chambers in each of which a door (7) is pivotably received. The door pivot pins (17) are carried by two pairs of struts (15,16) such that the pivot pins are spaced from the engine axis X-X'.

14 Claims, 7 Drawing Sheets

DOUBLE DOOR THRUST REVERSER ASSEMBLY WITH STRUT-CARRIER DOOR PIVOT PINS

BACKGROUND OF THE INVENTION

The present invention relates to thrust reverser assemblies for bypass jet engines of the pivoting door type.

Reversers of this type are already known, in which the doors are articulated about pivots in a fixed structure of an outer cowling surrounding the engine, more or less concentric with the longitudinal axis of the said engine, this outer cowling creating, along with the nozzle through which a flow of hot primary gases are ejected, an annular duct for a flow of cold bypass gases to flow through, originating from an upstream fan. In this type of installation, the pivoting doors are able to move, under the action of an actuation system, between a stowed position in which they close off openings made in the fixed structure of the cowling and a deployed position in which the said doors project radially outwards and close off the annular duct in order to deflect the flow of bypass gases.

Thus, for example, FR-A-2,622,928 filed on Nov. 5, 1987 describes a reverser system with doors in which the doors, in the stowed position, constitute the downstream end of the outer wall of the annular duct, the said doors being articulated on cantilevered longitudinal beams. This type of rear door reverser exhibits the advantage of allowing the doors to pivot without obstruction when they are actuated and, when the doors are in the deployed position, resulting in a maximum uncovering of the opening or reversal pit through which the bypass gases are deflected. This is due to the fact that the door pivots can be placed very close to the plane passing through the axis of the engine.

However, the consequence of this arrangement is that the downstream ends of the beams on which the doors are articulated are not held rigidly because they are cantilevered and this, owing to the substantial forces exerted in this area when the doors are deployed, has the risk of leading to severe malfunctioning, or even damage of the structures. Moreover, it is obvious that such a solution would not be suitable in cases where the rearward pivoting of the doors might be limited by the mechanical features of the engine. These drawbacks become particularly critical in cases where it is desired to make use of a reverser having two doors only.

A thrust reverser whose doors, each constituted by a half shell, pivot about an axis inclined relative to the vertical, due to two hinges located respectively at the upper end and at the lower end of each half shell, is also known from EP-A-0 048 669.

SUMMARY OF THE INVENTION

The present invention proposes a simple solution, combining improved safety of the reverser and more economical design, within the context of a two-door reverser. According to the invention, a two-door thrust reverser is characterized in that:

the fixed structure of the cowling consists of an annular forward structure situated upstream of the pivoting doors, of two longitudinal beams which are symmetric and parallel to the axis of the engine, and of an annular rear-structure situated downstream of the pivoting doors and secured to the longitudinal beams and to the forward structure;

and, for each of the doors, at least two struts secured to the fixed structure of the cowling extend, symmetrically with respect to a plane passing through the axis of the engine and the longitudinal centerline of the doors, as far as a region situated in the upper half of the distance separating the axis of the engine from the longitudinal centerline of each door, the said struts bearing the door pivots.

Thus, through the presence of the annular rear structure secured to the fixed structure, an optimum strength of the longitudinal beams is obtained, while avoiding any risk of having the doors come off their pivot attach points, which increases safety. In addition, the fact that the door pivots are moved back up to a noval position relative to the axis of the engine makes it possible to obtain a maximum opening of the doors and thus ensure correct deflection of the flow of bypass gases.

Preferably, according to the invention, the struts extend more or less as far as two-thirds of the way along the distance separating the axis of the engine from the longitudinal centerline of each door, starting from the axis of the engine. A particularly novel arrangement of the pivots, because it provides optimum effectiveness, is the one in which these are situated approximately two-thirds of the way along the distance separating the axis of the engine from the longitudinal centerline of the door, starting from the axis of the engine.

Still according to the invention, the struts are situated in the same plane as the fixed structure of the cowling in order not to impede the maneuvering of the doors. The struts may be secured to the annular forward structure of the cowling by extending longitudinally towards the rear structure; or be secured to the longitudinal beams of the fixed structure of the cowling and, in this case, they have a curved shape in order to match the curvature of the said cowling.

However, according to a preferred embodiment of the invention, associated with each of the doors are two pairs of struts which are symmetric with respect to the longitudinal centerline of the door, each pair of struts consisting of a first strut secured to the annular forward structure of the cowling and of a second strut secured, for its part, to a longitudinal beam of the cowling, these two struts being rigidly joined together. In this case, each door pivot is situated at the intersection of the two struts.

It will be added that the curved struts secured to the longitudinal beams are situated more than two-thirds of the way along the distance separating the forward structure and the rear structure starting from the forward structure, a preferred arrangement of these struts being between two-thirds and three-quarters of the way along the said distance.

BRIEF DESCRIPTION OF THE DRAWINGS

Other features and advantages of the present invention will become clear in the course of the following description, given as an example but not limited to, with reference to the attached drawings, in which.

DESCRIPTION OF PREFERRED EMBODIMENTS

Figure 1:
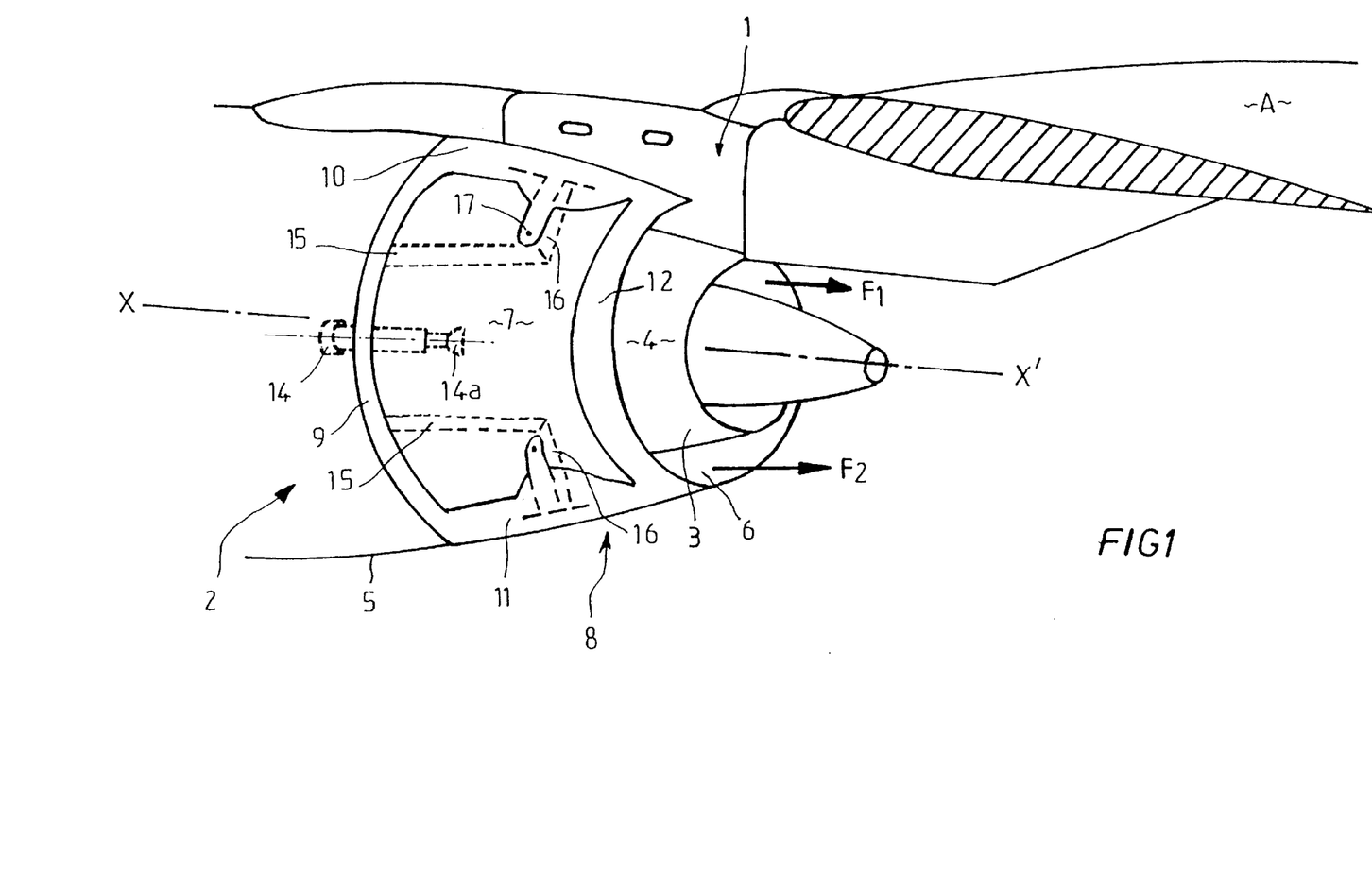
FIG. 1 represents, in perspective, the rear of a jet engine equipped with a two-door thrust reverser assembly according to the invention and mounted under the wing structure of an aircraft, the reverser doors being in the stowed position (i.e. closed)
Figure 3:
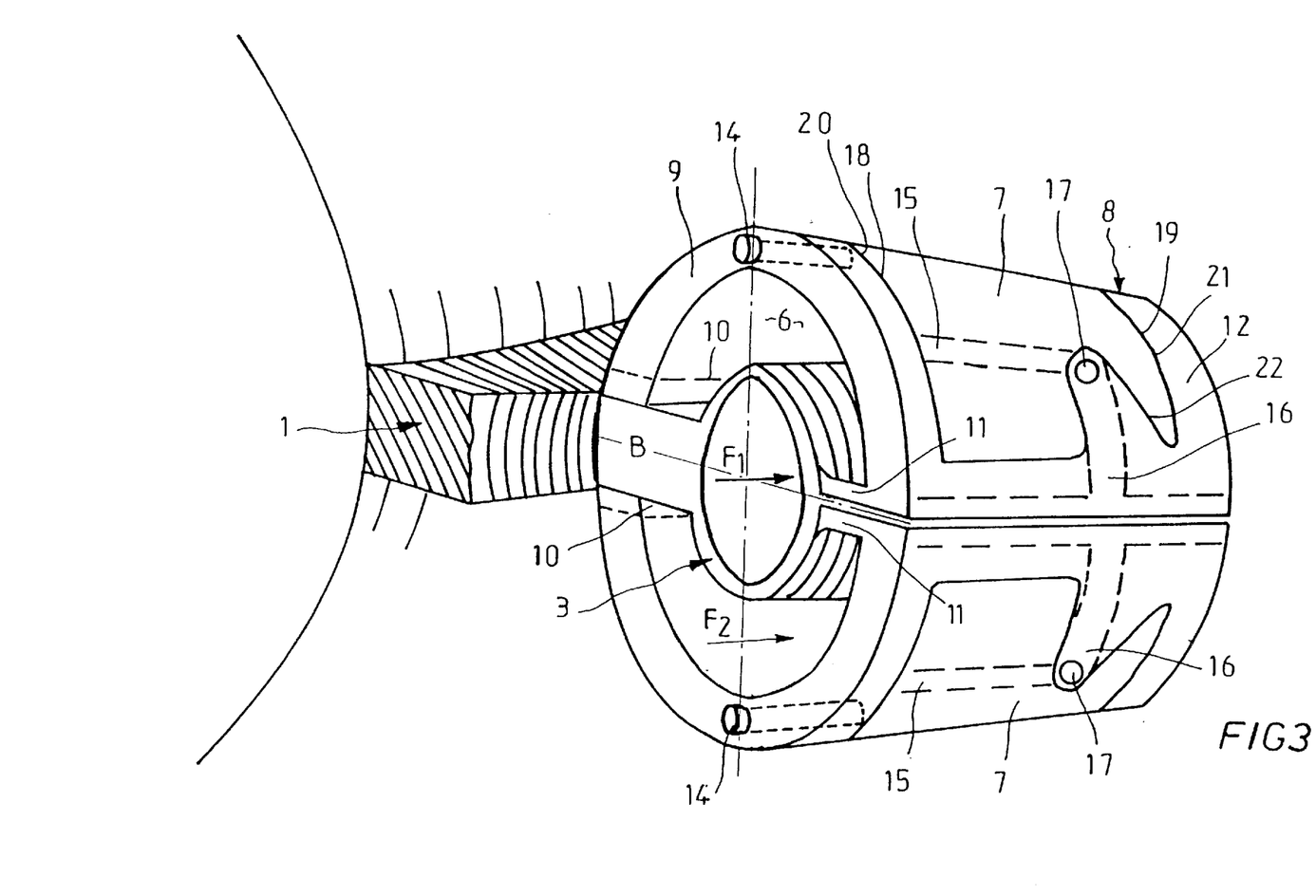
FIG. 3 schematically represents, in perspective, a thrust reverser assembly according to the invention mounted, this time, on the rear of the fuselage.
Figure 7:
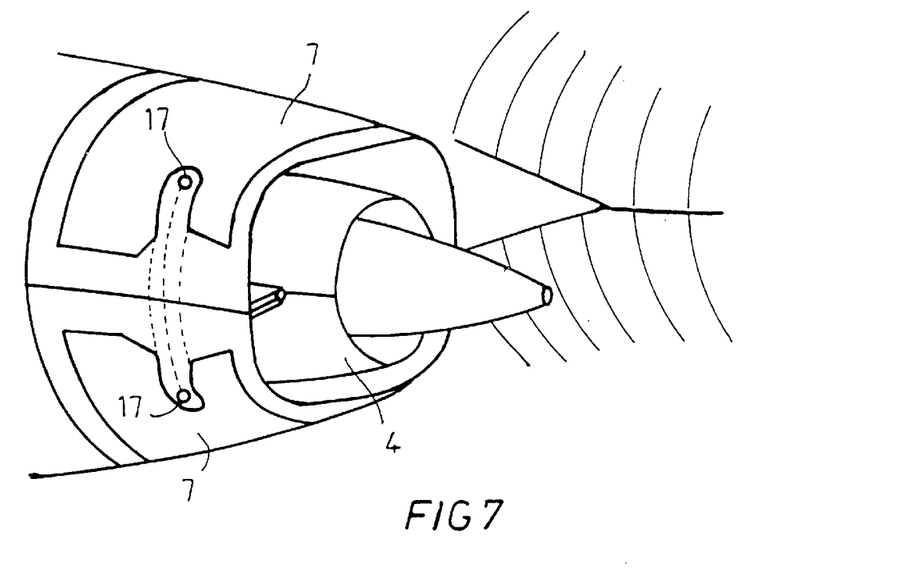
FIGS. 7 and 8 are alternative forms of the reverser assembly according to the invention, the assembly being mounted on the rear of the fuselage in FIG. 7 and under the wing structure in FIG. 8.

Represented in FIG. 1 is the rear part of a jet engine pod unit 2 mounted, via a bearing structure 1 under the wing structure A of an aircraft. It will, however, be understood that this unit could be fixed at any other appropriate point on the aircraft, for example on the rear of the fuselage, as represented in FIGS. 3 and 7. The engine is a conventional bypass engine having a nozzle 3 through which the hot gases from the engine are exhausted, in the direction of the arrow $F_1$, an outer cowling denoted overall as 5, surrounding the engine and the nozzle 3 for ejecting hot gases. Between the outer cowling 5 and the external surface 4 of the nozzle is formed an annular duct 6 (FIG. 3) allowing the cold flow coming from an upstream fan, not represented, to flow in the direction of the arrow $F_2$.

Figure 2:
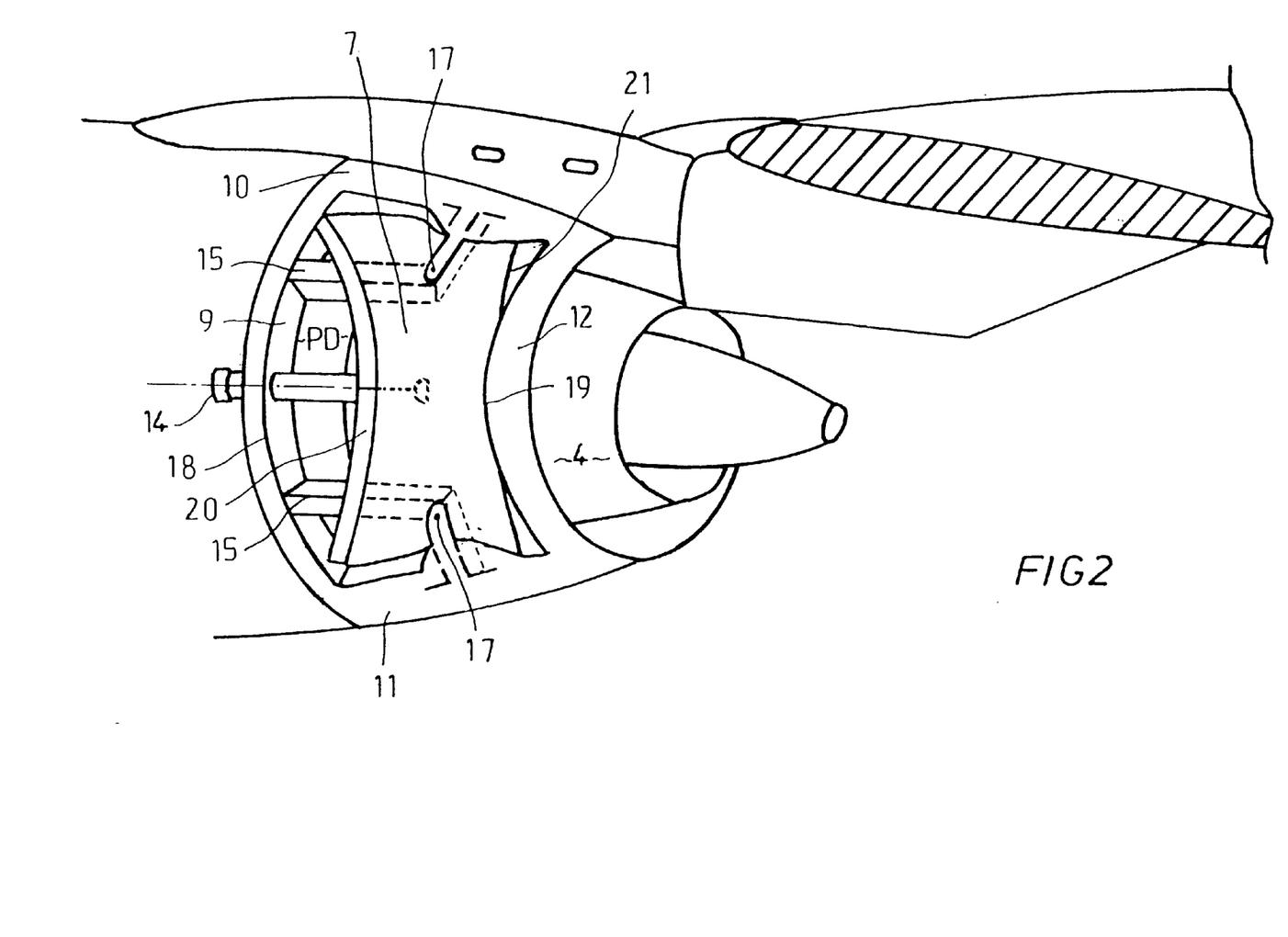
FIG. 2 is a view similar to that of FIG. 1 showing the reverser in the doors-deployed position (i.e. open)

The general reference 8 denotes the thrust reversal assembly proper, and the general reference 7 denotes the pivoting doors which are housed in a opening or reversal pit PD which they close off or uncover depending on whether they are in the stowed position (FIG. 1) or in the deployed position (FIG. 2). The reversal pit is defined by a fixed structure comprising an annular forward structure 9, longitudinal beams 10 and 11 (see FIG. 3) and an annular rear structure 12, the beams, the rear structure and the forward structure being rigidly joined together and to the structure of the aircraft by a pylon B. Each of the two doors 7 is attached at 14a to the end of a control jack 14 fixed by its other end into the fixed structure of the cowling.

Two struts 15 secured to the fixed forward structure 9 extend, in the plane of the cowling, longitudinally towards the rear structure 12, while two more curved struts 16, secured to the longitudinal beams 10, 11 extend toward one another in the plane of the door 7, in the direction of the longitudinal centerline LM thereof. The struts 15 and 16 of each pair of neighbouring struts are secured together at their point of intersection, which also serves as a seating for the pivot 17 about which the door 7 pivots. As visible in FIGS. 3 and 5, in the doors-closed position, the front edge 20 and rear edge 21 of these doors lie flush with the front edge 18 and rear edge 19 of the fixed structure of the cowling.

Figure 5:
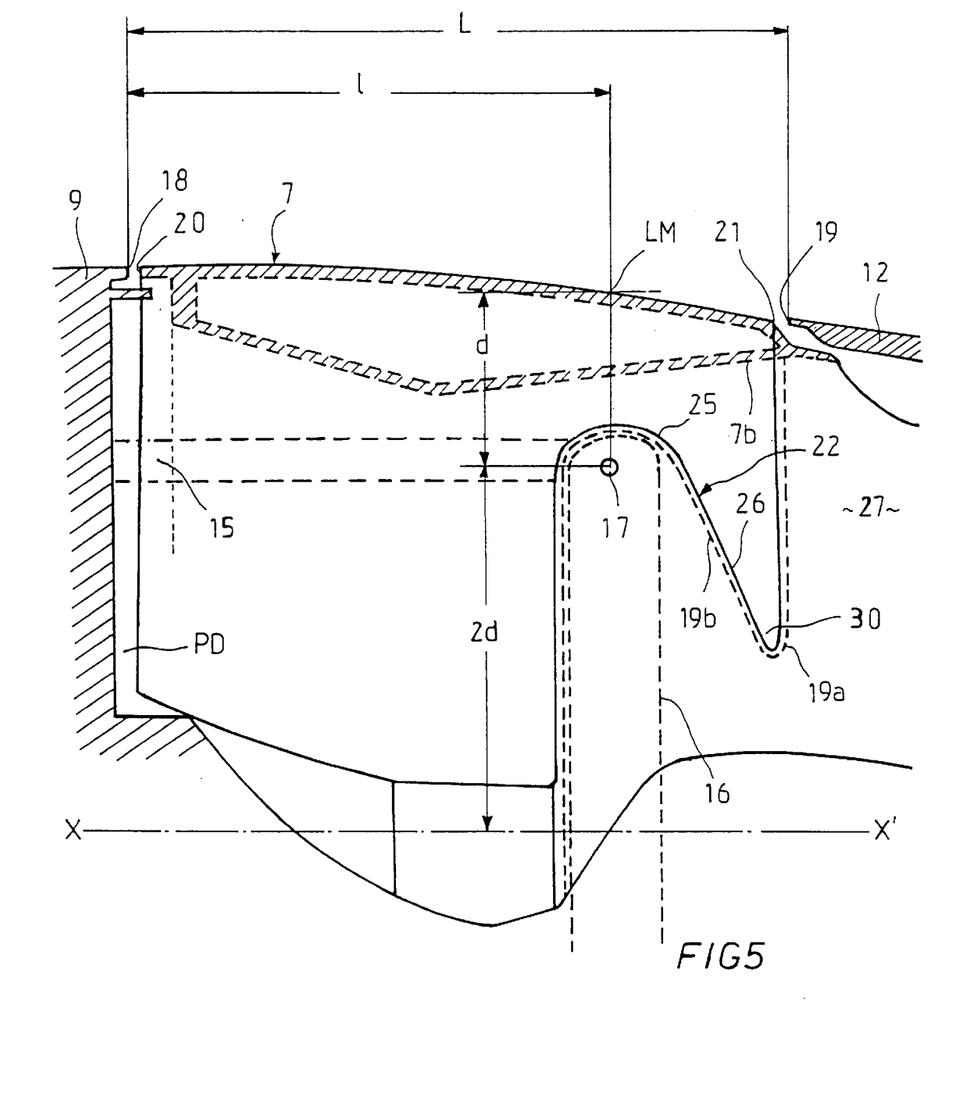
FIG. 5 is a side view of a closed door.

The quite specific position of the pivots 17 characterizing the invention will now be specified with reference to FIG. 5. If it is taken that the distance separating the axis X—X' of the engine from the centerline LM of the outer surface of the door 7 in the closed position is equal to 3d, the pivot 17 lies approximately two-thirds (2d) of the way along this distance starting from the axis X—X'. It is by virtue of this elevated situation with respect to the axis X—X' of the engine that it is possible to achieve maximum opening of the door 7 as represented in FIG. 6 without being impeded by the presence of the fixed rear structure 12.

Moreover, the distance "l" separating the pivot 17 from the edge 18 of the fixed forward structure 9 is advantageously between two-thirds and three-quarters of the way along the distance "L" separating the edges 18 and 19 of the fixed forward structure and fixed rear structure.

The structure of the doors 7 will now be described in greater detail, this structure having been defined to allow correct functioning taking into account the novel position of the pivots. As may be seen in FIG. 4, in the area where the door is articulated to the pivots, the internal face 7b of the door 7 has, in its thickness, two longitudinal housings 23 the shape of which complements that of the struts 15 so that these fit easily into the said housings 23 when the doors 7 are closed. These housings 23 have the shape of two parallel channels. In the thickness of the external face 7a of the door (FIGS. 4 and 5) there have been provided two symmetric housings denoted overall as 22. These housings 22 have substantially the shape of a triangle, the apex 25 of which lies next to the pivot 17 for the door 7, and the base of which emerges along the longitudinal edge of the door and towards the rear thereof, the hypotenuse 26 of the triangular housing 22 forming, with the rear edge 21 of the door, a dovetail shape 30.

Figure 4:
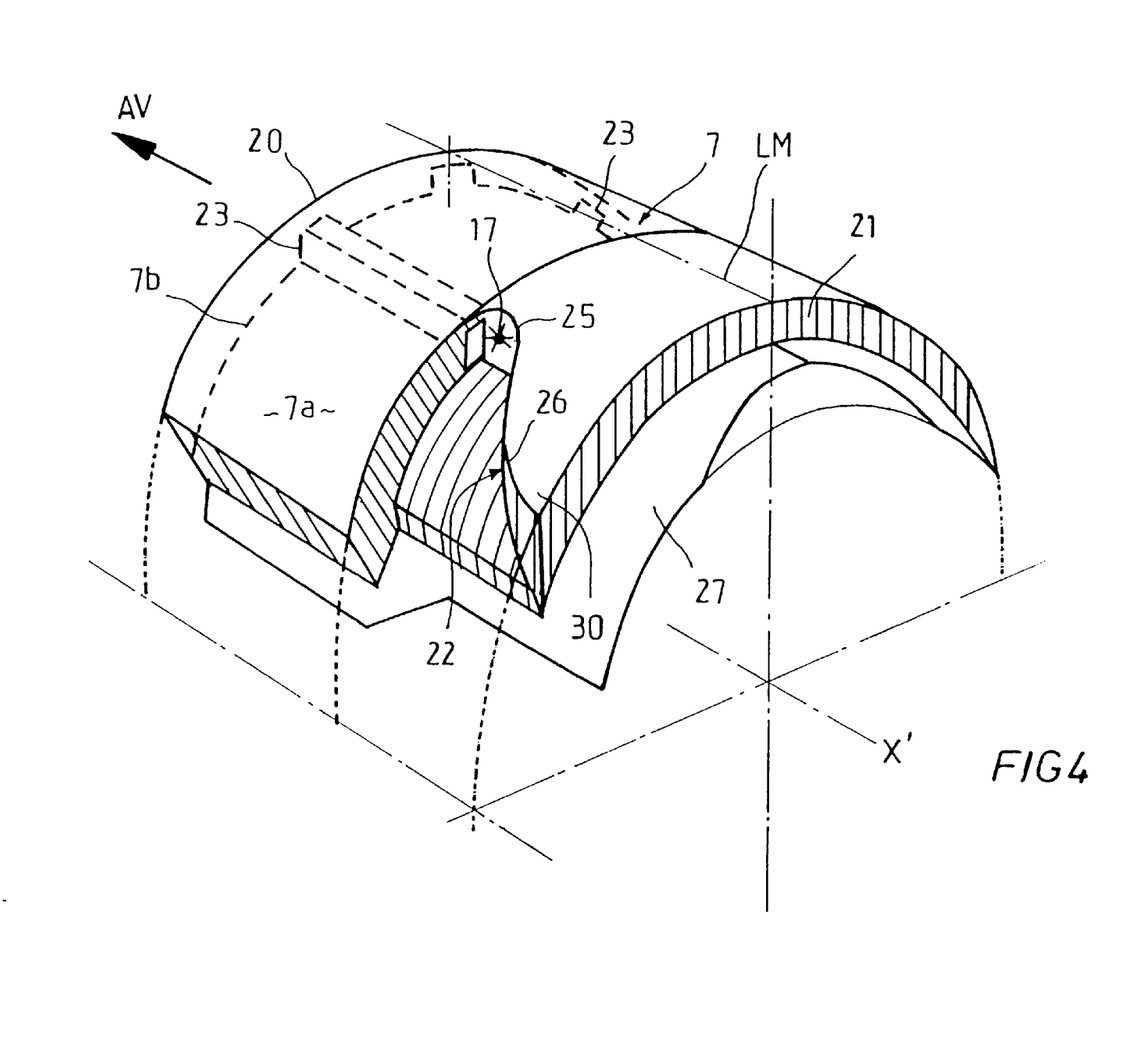
FIG. 4 is a schematically perspective view of a reverser door according to the invention in which the arrow indicates the forwards direction.
Figure 6:
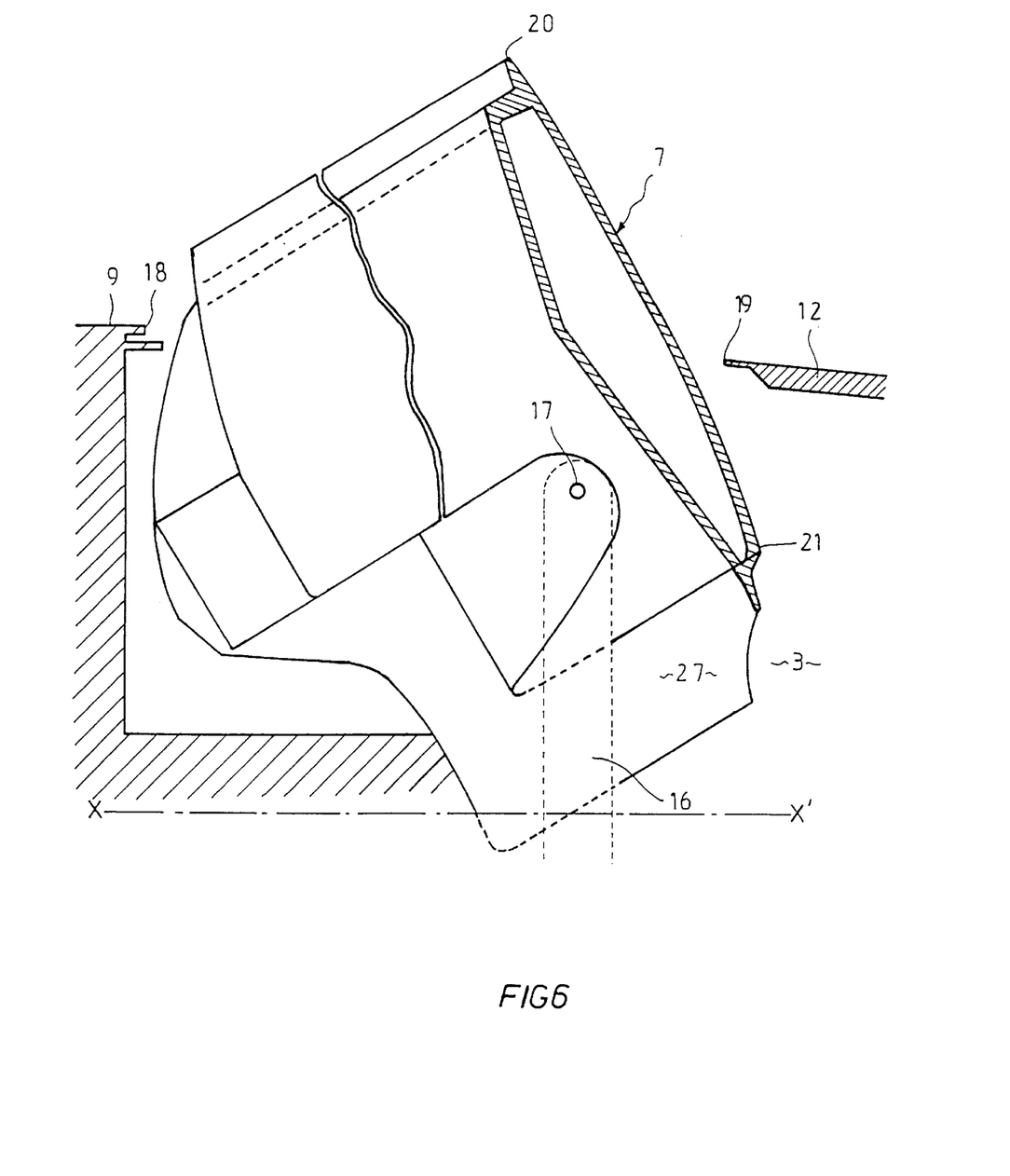
FIG. 6 is a view similar to FIG. 5 but with partial cutaway of the door, this time represented in the open position.

FIGS. 4, 5 and 6 show clearly that the internal face 7b of the door 7 overhangs greatly at 27, especially towards the rear, so that it can, as shown in FIG. 6, exactly fit over the curves of the external surface 4 of the nozzle 3 in order to block off the bypass flow $F_2$ effectively and deflect it radially outwards through the reversal pit PD when the doors are deployed. It will be noted that, by virtue of the position of the pivots 17, the doors 7 can open through a maximum angle which is, in all cases, greater than 45°, which ensures effective deflection of the jet. Finally, it will be noted that the lateral edge of the reversal pit PD preferably has a profile 19a–19b (see FIGS. 5 and 6) which corresponds substantially to the dovetail shape 30 of the rear of the external face 7b of the door 7.

Figure 8:
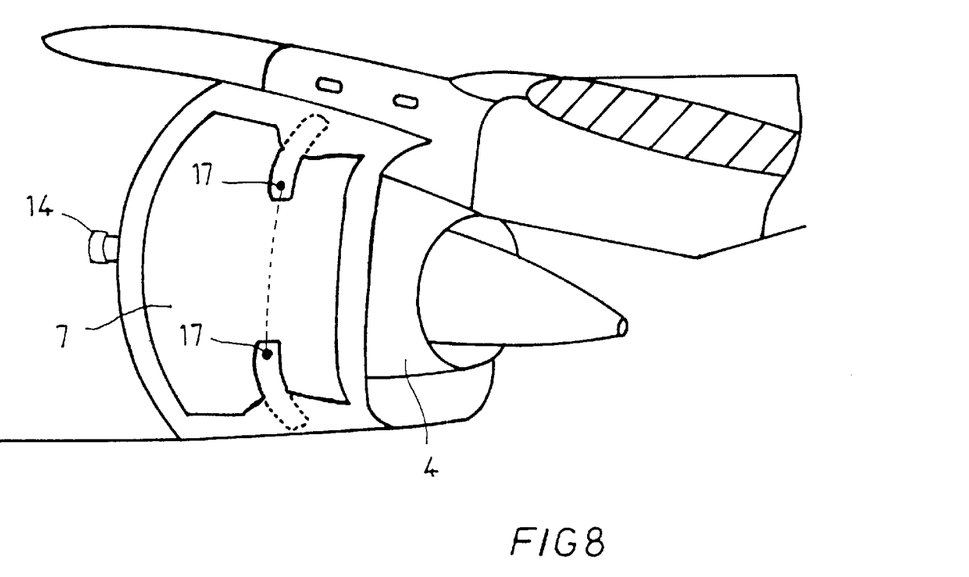

FIGS. 7 and 8 show, by way of examples, other arrangements and other shapes that the engine pod assembly could adopt. In these figures, the same references denote the same components as in FIGS. 1 to 6. In particular, instead of being in the presence, as in FIGS. 1 to 6, of a nacelle of substantially circular shape, the invention could be used for nacelles of quadrilateral shape (FIG. 7) without departing from the scope of the invention, the engine nacelle assembly being mounted on the rear of the fuselage in FIG. 7 and under the wing structure in FIG. 8.

We claim:

1. Thrust reverser assembly for a bypass jet engine of the type having two pivoting doors articulated about pivots in a fixed structure of an outer cowling surrounding the engine, more or less concentric with a longitudinal axis of the engine, the outer cowling creating, along with the nozzle through which a flow of hot primary gases are ejected, an annular duct for cold bypass gases to flow through, the pivoting doors moving, under the action of an actuation system, between a stowed position in which they close off openings made in the fixed structure of the cowling and a deployed position in which the doors project radially outwards and close off the annular duct in order to deflect the flow of bypass gases, said thrust reverser assembly being characterized in that:

the fixed structure of the cowling consists of an annular forward structure situated upstream of the pivoting doors, of two longitudinal beams which are symmetric and parallel to the axis of the engine, and of an annular rear structure situated downstream of the pivoting doors and secured to the longitudinal beams and to the forward structure;

and, for each of the doors, at least two struts secured to the fixed structure of the cowling extend, symmetrically with respect to a plane passing through the axis of the engine and longitudinal centerline of the doors, as far as a region situated greater than half of the distance separating the axis of the engine from the longitudinal centerline of each door, starting from the axis of the engine, the struts bearing the door pivots.

2. Thrust reverser assembly according to claim 1, characterized in that the struts extend more or less as far as two-thirds of the way along the distance separating the axis of the engine from the longitudinal centerline of each door, starting from the axis of the engine.

3. Thrust reverser assembly according to claim 1, characterized in that the pivots of each of the doors are situated approximately two-thirds of the way along the distance separating the axis of the engine from the longitudinal centerline of the door, starting from the axis of the engine.

4. Thrust reverser assembly according to claim 1, characterized in that the struts are situated in the same plane as the fixed structure of the cowling.

5. Thrust reverser assembly according to claim 1, characterized in that the struts are secured to the annular forward structure of the cowling and extend longitudinally towards the rear structure.

6. Thrust reverser assembly according to claim 1, characterized in that the struts are secured to the longitudinal beams of the fixed structure of the cowling and have a curved shape in order to match the curvature of the said cowling.

7. Thrust reverser assembly according to claim 1, characterized in that associated with each door are two pairs of struts which are symmetric with respect to the longitudinal centerline of the door, each pair of struts consisting of a first strut secured to the annular forward structure of the cowling and of a second strut secured to a longitudinal beam of the cowling, these two struts being rigidly joined together.

8. Thrust reverser assembly according to claim 1, characterized in that associated with each door are two pairs of struts which are symmetric with respect to the longitudinal centerline of the door, each pair of struts consisting of a first strut secured to the annular forward structure of the cowling and of a second strut secured to a longitudinal beam of the cowling, these two struts being rigidly joined together and each door pivot being situated at an intersection of the two struts.

9. Thrust reverser assembly according to claim 1, characterized in that the struts are secured to the longitudinal beams of the fixed structure of the cowling and have a curved shape in order to match the curvature of the said cowling, said curved struts being situated more than two-thirds of the way along the distance separating forward structure and rear structure, starting from the forward structure.

10. Thrust reverser assembly according to claim 1, characterized in that, in the area where each door is articulated to the pivots, each door has, in its thickness, housings which fit over the struts when the door is in the stowed position.

11. Thrust reverser assembly according to claim 1, characterized in that, in the area where each door is articulated to the pivots, each door has, in its thickness, housings which fit over the struts when the door is in the stowed position, the housings for the struts secured to the forward structure being made in an internal face of the door and having the shape of two parallel channels.

12. Thrust reverser assembly according to claim 1, characterized in that, in the area where each door is articulated to the pivots, each door has, in its thickness, housings which fit over the struts when the door is in the stowed position, the housings for the struts secured to the longitudinal beams being made in an external face of the door.

13. Thrust reverser assembly according to claim 1, characterized in that, in the area where each door is articulated to the pivots, each door has, in its thickness, housings which fit over the struts when the door is in the stowed position, the housings made in an external face of the door having a substantially triangular shape, an apex of which is close to the door pivot, and the base of which emerges on a longitudinal edge of the door and towards the rear thereof.

14. Thrust reverser assembly according to claim 1, characterized in that, in the area where each door is articulated to the pivots, each door has, in its thickness, housings which fit over the struts when the door is in the stowed position, the housings made in an external face of the door having a substantially triangular shape, an apex of which is close to the door pivot, and a base of which emerges on a longitudinal edge of the door and towards the rear thereof and the rear of the door having a substantially dovetail shape.

* * * * *